US012774626B2

(12) United States Patent
Liu et al.

(10) Patent No.: US 12,774,626 B2
(45) Date of Patent: Oct. 27, 2026

(54) HINGE ASSEMBLY AND KITCHEN DEVICE

(71) Applicant: FOSHAN SHUNDE MIDEA WASHING APPLIANCES MANUFACTURING CO., LTD., Foshan (CN)

(72) Inventors: Jianbin Liu, Foshan (CN); Yaodong Wang, Foshan (CN); Baoping Zeng, Foshan (CN); Huawei Tao, Foshan (CN); Zhonghua Li, Foshan (CN); Xiang Li, Foshan (CN)

(73) Assignee: FOSHAN SHUNDE MIDEA WASHING APPLIANCES MANUFACTURING CO., LTD., Foshan (CN)

(*) Notice: Subject to any disclaimer, the term of this patent is extended or adjusted under 35 U.S.C. 154(b) by 0 days.

(21) Appl. No.: 18/913,563

(22) Filed: Oct. 11, 2024

(65) Prior Publication Data

US 2025/0034923 A1 Jan. 30, 2025

Related U.S. Application Data

(63) Continuation of application No. PCT/CN2023/092708, filed on May 8, 2023.

(30) Foreign Application Priority Data

May 25, 2022 (CN) ......................... 202210583131.1
May 25, 2022 (CN) ......................... 202221286430.0

(51) Int. Cl.
*E05D 3/18* (2006.01)
*E05D 11/06* (2006.01)

(52) U.S. Cl.
CPC ................ *E05D 3/18* (2013.01); *E05D 11/06* (2013.01); *E05Y 2900/30* (2013.01)

(58) Field of Classification Search
CPC ....... E05D 3/18; E05D 11/06; E05Y 2900/30; E05Y 2800/296; E05Y 2900/302; E05Y 2900/304; E05Y 2900/308
See application file for complete search history.

(56) References Cited

U.S. PATENT DOCUMENTS 1,075,130 A * 10/1913 Streberger ................ E05D 3/18 5/47
2,793,387 A * 5/1957 Odell ........................ E05D 3/18 16/358

(Continued)

FOREIGN PATENT DOCUMENTS

CN 204199928 U 3/2015
CN 106196819 A 12/2016

(Continued)

OTHER PUBLICATIONS

China National Intellectual Property Administration (CNIPA) Office Action 1 for Application No. 202210583131.1, Jul. 2, 2025 10 Pages (including translation).

(Continued)

*Primary Examiner* — Jeffrey O'Brien
(74) *Attorney, Agent, or Firm* — Anova Law Group, PLLC

(57) ABSTRACT

A hinge assembly includes a fixed leaf and a movable leaf. The fixed leaf includes a first pin shaft and a second pin shaft. The movable leaf has a first slide groove cooperating with the first pin shaft and a second slide groove cooperating with the second pin shaft in such a manner that the movable leaf is capable of switching between an open position and a closed position. An end portion at a lower edge of the movable leaf moves away from a lower edge of the fixed leaf at a beginning of an opening or closing process of the (Continued)

movable leaf, and the end portion is located in a same horizontal plane at the open position and the closed position.

19 Claims, 5 Drawing Sheets

(56) References Cited

U.S. PATENT DOCUMENTS

| | | | | |
|---|---|---|---|---|
| 2,867,839 | A * | 1/1959 | Squire | E05D 3/18 16/358 |
| 3,065,498 | A * | 11/1962 | Johnson | E05D 3/18 16/359 |
| 4,068,348 | A | 1/1978 | Chivers | |
| 5,172,969 | A * | 12/1992 | Reuter | A47B 96/00 312/328 |
| 6,493,906 | B2 * | 12/2002 | Matteau | E05D 3/18 16/358 |
| 6,945,621 | B2 * | 9/2005 | Shin | F25D 23/028 312/405 |
| 8,303,059 | B2 * | 11/2012 | Darney | E05D 3/18 312/405 |
| 9,380,863 | B2 * | 7/2016 | Sakanoue | B60N 3/004 |
| 10,876,333 | B2 * | 12/2020 | Zhang | E05D 3/18 |
| 12,018,882 | B2 * | 6/2024 | Xia | F25D 23/028 |
| 12,038,224 | B2 * | 7/2024 | Xia | E05D 7/081 |
| 12,038,226 | B2 * | 7/2024 | Zhang | F25D 23/028 |
| 12,044,461 | B2 * | 7/2024 | Xia | E05D 7/084 |
| 12,049,775 | B2 * | 7/2024 | Xia | E05D 7/081 |
| 12,055,335 | B2 * | 8/2024 | Zhu | E05D 11/06 |
| 2021/0102419 | A1 * | 4/2021 | Braden | E06B 7/28 |
| 2022/0259904 | A1 * | 8/2022 | Xia | F25D 23/028 |
| 2022/0260302 | A1 * | 8/2022 | Xia | E05D 3/18 |
| 2024/0167756 | A1 * | 5/2024 | Yang | F25D 23/063 |
| 2024/0219106 | A1 * | 7/2024 | Yang | E05D 7/081 |
| 2025/0003670 | A1 * | 1/2025 | Wang | F25D 23/028 |

FOREIGN PATENT DOCUMENTS

| | | | | |
|---|---|---|---|---|
| CN | 107951451 | A | | 4/2018 |
| CN | 111155859 | A | | 5/2020 |
| CN | 112282541 | A | | 1/2021 |
| CN | 216142598 | U | | 3/2022 |
| CN | 216517461 | U | | 5/2022 |
| CN | 217681165 | U | | 10/2022 |
| DE | 3010342 | A1 | | 4/1981 |
| EP | 2011941 | A1 | | 1/2009 |
| EP | 2881029 | A1 | | 6/2015 |
| EP | 3800313 | A2 | | 4/2021 |
| WO | WO2021/012654 | | * | 1/2021 |
| WO | WO2021/012655 | | * | 1/2021 |

OTHER PUBLICATIONS

The European Patent Office (EPO) The Extended European Search Report for Application No. 23810809.6, Apr. 25, 2025 7 Pages.

The World Intellectual Property Organization (WIPO) International Search Report and Written Opinion for PCT/CN2023/092708 Aug. 24, 2023 24 Pages (including translation).

The China National Intellectual Property Administration (CNIPA) The Notification to Grant Patent Right for Invention for Chinese Application 202210583131.1, Nov. 12, 2025 3 Pages (With Translation).

Japan Patent Office (JPO) The Office Action for JP Application No. 2024-555205 Aug. 5, 2025 5 Pages (Translation Included ).

The European Patent Office (EPO) Extended Search Report for EP Application No. 23810809.6 Jun. 11, 2026 5 Pages.

* cited by examiner

HINGE ASSEMBLY AND KITCHEN DEVICE

CROSS-REFERENCE TO RELATED APPLICATIONS

This application is a continuation of International Application No. PCT/CN2023/092708, filed on May 8, 2023, which claims priority to Chinese Patent Application Nos. 202210583131.1 and 202221286430.0, titled “HINGE ASSEMBLY AND KITCHEN DEVICE” and filed on May 25, 2022, the entire contents of all of which are incorporated herein by reference.

FIELD

The present disclosure relates to the field of household electrical appliances, and more particularly, to a hinge assembly and a kitchen device.

BACKGROUND

A kitchen device is typically embedded in a cabinet and has a door configured to flip outwardly to open or close a treatment space of the kitchen device, such as a cooking space of an oven, or a cleaning space of a dishwasher.

However, the cabinet is provided with a skirting board to enhance the aesthetic appeal of the rom. The door of the kitchen device is large and has a predetermined thickness, which would interfere with the skirting board while the door is being opened. Therefore, the skirting board needs to be partly cut to avoid the door, which would affect the aesthetic appeal of the room.

SUMMARY

The present disclosure aims to solve at least one of the technical problems existing in the related art. To this end, embodiments of the present disclosure provide a hinge assembly. The hinge assembly can avoid interference with a skirting board at the beginning of an opening or closing process of a door, and thus it is not necessary to cut the skirting board. Therefore, indoor aesthetic appeal can be improved.

Embodiments of the present disclosure also provides a kitchen device using the hinge assembly as described above.

According to embodiments of the present disclosure, the hinge assembly includes a fixed leaf and a movable leaf. The fixed leaf is provided with a first pin shaft and a second pin shaft. The movable leaf has a first slide groove cooperating with the first pin shaft and a second slide groove cooperating with the second pin shaft in such a manner that the movable leaf is capable of switching between an open position and a closed position. The movable leaf has an end portion at a lower edge of the movable leaf. The end portion moves away from a lower edge of the fixed leaf at the beginning of an opening or closing process of the movable leaf. The end portion is located in a same horizontal plane at the open position and the closed position.

Therefore, by providing the first pin shaft to cooperate with the first slide groove and the second pin shaft to cooperate with the second slide groove, through double movement trajectory restricted cooperation, the end portion can first move away from the lower edge of the fixed leaf at the beginning of the opening or closing process of the movable leaf, and the end portion is located in the same horizontal plane at the open position and the closed position. On the one hand, interference between the door disposed at the movable leaf and the skirting board can be avoided, thus it is not necessary to cut the skirting board. Therefore, the indoor aesthetic appeal can be improved. On the other hand, a movement trajectory of the door is more reasonable, allowing a space occupied by the door at the open position to be smaller, which can reduce a space requirement of the kitchen device and improve the layout convenience.

In some embodiments, the second pin shaft is disposed in front of the first pin shaft.

In some embodiments, the first pin shaft is disposed at a higher position than the second pin shaft.

In some embodiments, the first slide groove includes a first groove section, and a travel start point in the first slide groove is located at an end of the first groove section.

In some embodiments, the first groove section is configured to rotate the end portion and move the end portion upwardly in the opening process of the movable leaf.

In some embodiments, the second slide groove includes a second groove section, and a travel start point in the second slide groove is located at an end of the second groove section.

In some embodiments, the second groove section is configured to rotate the end portion and move the end portion upwardly in the opening process of the movable leaf.

In some embodiments, the first groove section is constructed as a rearwardly bent arc-shaped groove at the closed position.

In some embodiments, the second groove section is constructed as a rearwardly bent arc-shaped groove at the closed position.

In some embodiments, the second groove section has an arc length smaller than an arc length of the first groove section.

In some embodiments, the first groove section has an equivalent circular radius greater than an equivalent circular radius of the second groove section.

In some embodiments, the first groove section is in communication with a third groove section.

In some embodiments, the third groove section is configured to move the end portion downwardly in the opening process of the movable leaf.

In some embodiments, the second groove section is in communication with a fourth groove section.

In some embodiments, the fourth groove section is configured to move the end portion downwardly in the opening process of the movable leaf.

In some embodiments, at the closed position, the third groove section is inclined forwardly and extends downwardly.

In some embodiments, at the closed position, the fourth groove section is inclined forwardly and extends downwardly.

In some embodiments, the third groove section has a length greater than a length of the fourth groove section.

In some embodiments, the first slide groove further includes a fifth groove section in communication with the third groove section.

In some embodiments, a travel end point in the first slide groove is located at the fifth groove section.

In some embodiments, the fifth groove section is configured to drive the end portion to rotate in the opening process of the movable leaf.

In some embodiments, the fifth groove section is constructed as an arc-shaped groove.

In some embodiments, a travel end point in the second slide groove is located at the fourth slide groove.

According to some embodiments of the present disclosure, one of the movable leaf and the fixed leaf is provided with a limit plate, and another one of the movable leaf and the fixed leaf is provided with a limit arm cooperating with the limit plate.

Embodiments of the present disclosure further provide a kitchen device. The kitchen device includes a housing, a door, and the hinge assembly as described in the above embodiments. The fixed leaf is disposed at the housing, and the movable leaf is disposed at the door.

Additional aspects and advantages of the present disclosure will be given at least in part in the following description, or become apparent at least in part from the following description, or can be learned from practicing of the embodiments of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings.

DETAILED DESCRIPTION OF THE EMBODIMENTS

Figure 1:
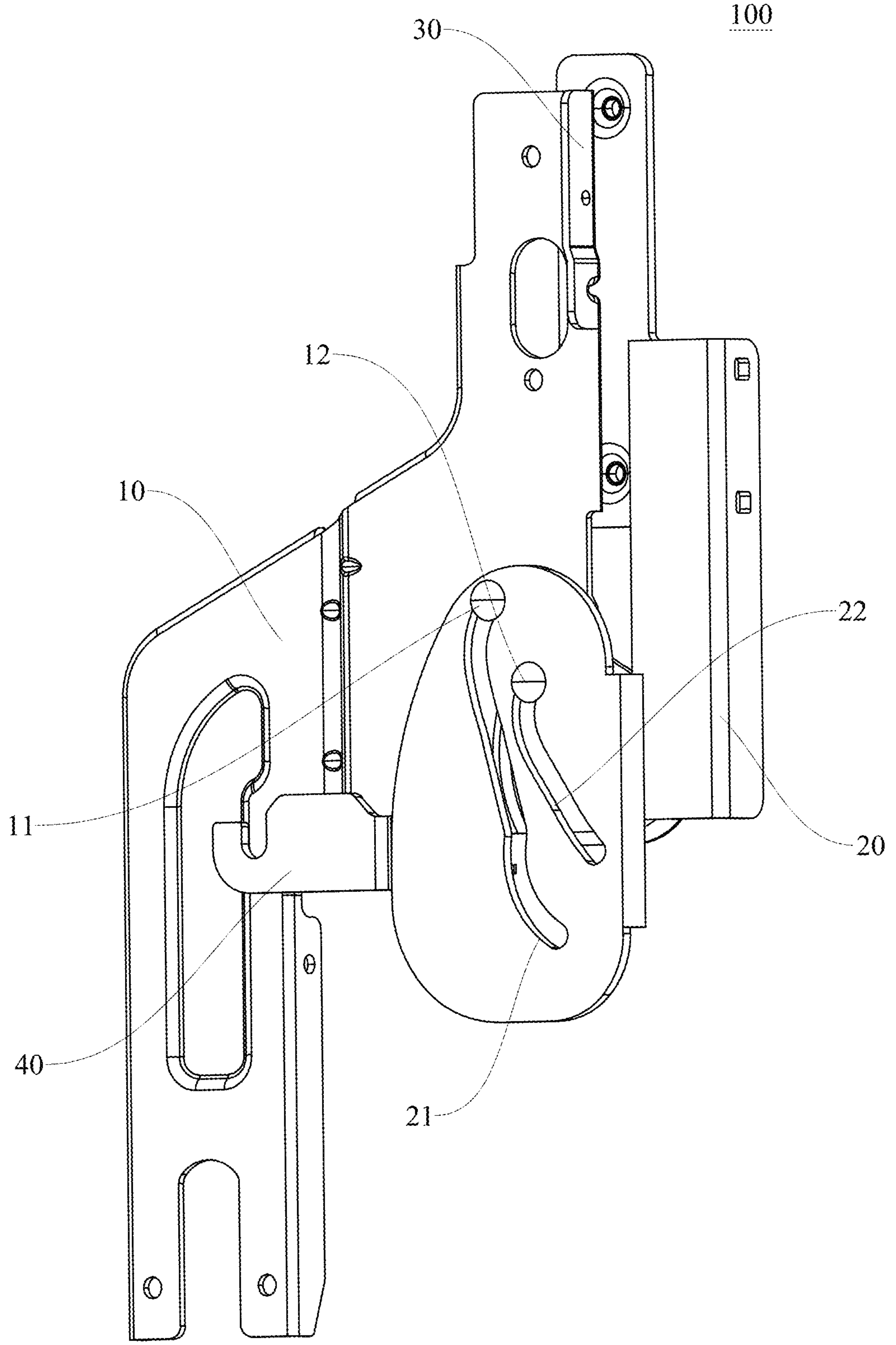
FIG. 1 is a schematic perspective view of a hinge assembly according to an embodiment of the present disclosure.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

In the description of the present disclosure, it should be understood that the orientation or position relationship indicated by the terms such as "upper," "lower," "front," "rear," "left," "right," "vertical," "horizontal," "top," "bottom," "inner," and "outer" should be construed to refer to the orientation or the position as shown in the drawings, and is only for the convenience of describing the present disclosure and simplifying the description, rather than indicating or implying that the pointed apparatus or element must have a specific orientation, or be constructed and operated in a specific orientation, and therefore cannot be understood as a limitation on the present disclosure.

It should be noted that terms "first" and "second" are only used for descriptive purposes, and cannot be understood as indicating or implying relative importance or implicitly indicating the number of the indicated technical features. Therefore, the features associated with "first" and "second" may explicitly or implicitly include one or more features. In the description of the present disclosure, "plurality" means two or more, unless otherwise specifically defined.

First of all, it should be noted that a kitchen device may be a kitchen cleaning device which is embedded in a cabinet or a closet, such as a dishwasher or a kitchen cooking device such as a steamer, an oven, or the like. The kitchen device of such a type has a treatment space (i.e., a cooking space of the oven, the steamer, or the like, or a cleaning space of the dishwasher), and is required to be provided with a door to selectively open or close the treatment space to improve cleaning or cooking result.

However, based on cooking or cleaning requirements, when the door is at a closed position, it is needed for the kitchen device to ensure that the treatment space is isolated from external environment, and thus the kitchen device should have good sealing performance. Therefore, the door is made relatively larger and has a predetermined thickness. However, the door of a larger thickness has a larger displacement in an opening process of the door, and a lower edge of the door would easily interfere with a skirting board, causing the door not to be opened. If the skirting board is cut, indoor aesthetic appeal will be affected.

Therefore, embodiments of the present disclosure provide a hinge assembly 100. the hinge assembly 100 can adjust a movement trajectory of the door to avoid interference of the door with the skirting board at the beginning of opening or closing process of the door. In this way, it is not necessary to cut the skirting board, and thus the indoor aesthetic appeal can be improved.

The hinge assembly 100 and a kitchen device according to the embodiments of the present disclosure will be described below with reference to FIG. 1 to FIG. 5.

Figure 2:
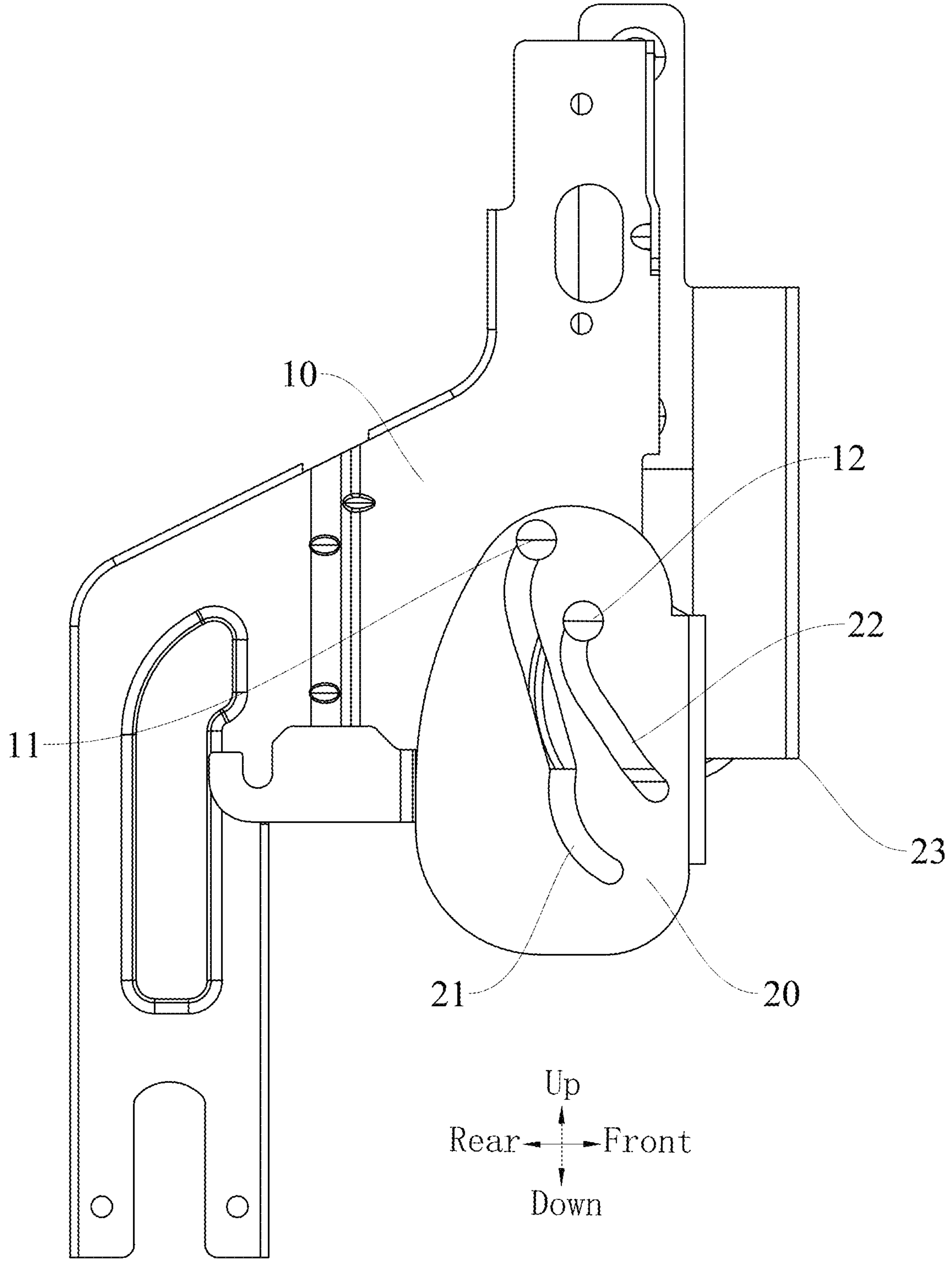
FIG. 2 is a schematic view of a hinge assembly at a closed position according to an embodiment of the present disclosure.
Figure 3:
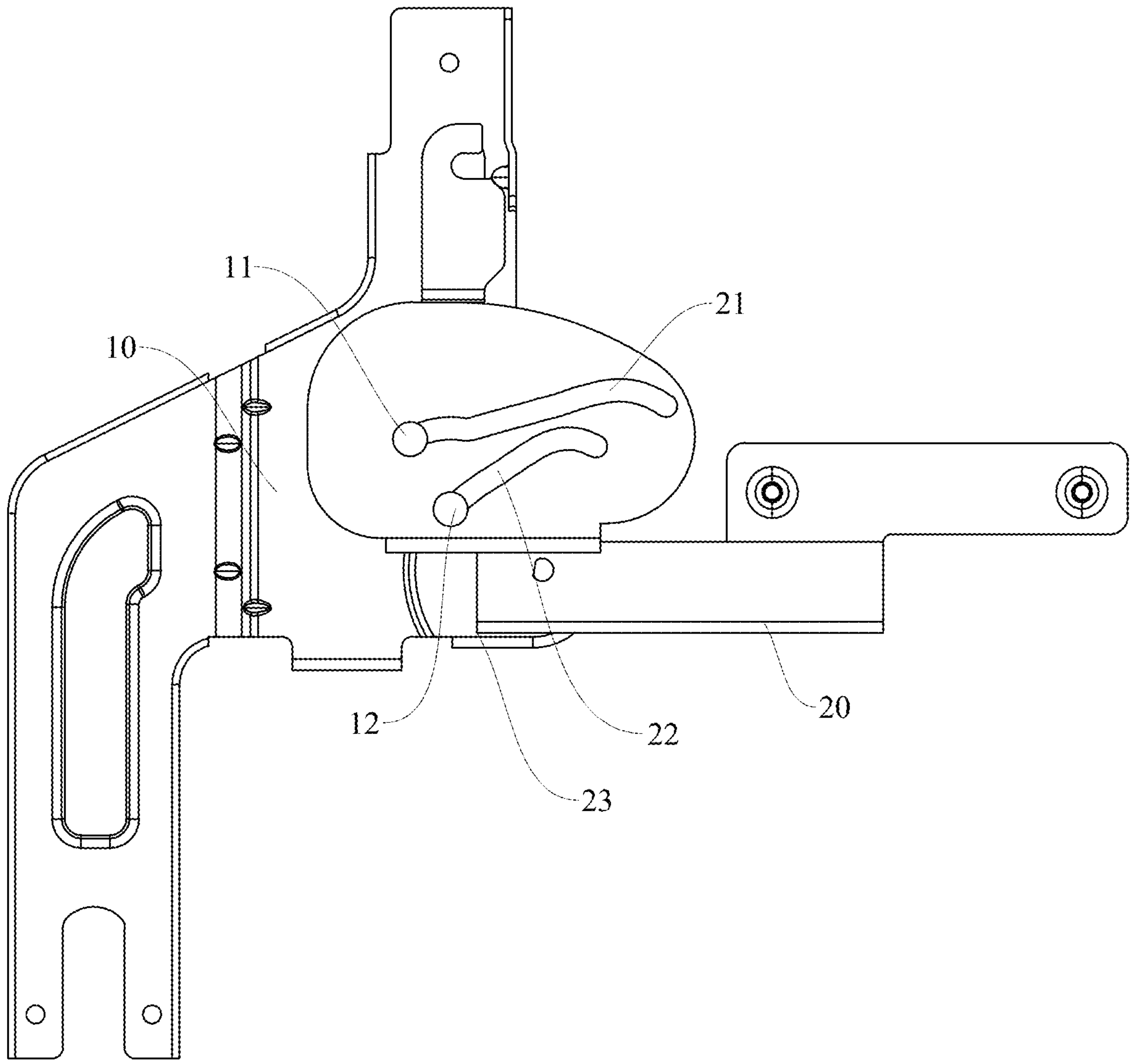
FIG. 3 is a schematic view of a hinge assembly at an open position according to an embodiment of the present disclosure.

As shown in FIG. 1, FIG. 2, and FIG. 3, the hinge assembly 100 according to the embodiments of the present disclosure includes a fixed leaf 10 and a movable leaf 20. The movable leaf 20 can pivot relative to the fixed leaf 10 to switch between an open position and a closed position. Correspondingly, the door may be connected to the movable leaf 20, and a housing may be connected to the fixed leaf 10, realizing opening or closing of the door relative to the housing.

The fixed leaf 10 is provided with a first pin shaft 11 and a second pin shaft 12. The movable leaf 20 has a first slide groove 21 cooperating with the first pin shaft 11 and a second slide groove 22 cooperating with the second pin shaft 12 in such a manner that the movable leaf 20 is capable of switching between an open position and a closed position. An end portion 23 of the movable leaf 20 moves away from a lower edge of the fixed leaf 10 at the beginning of an opening or closing process of the movable leaf 20. The end portion 23 is located in a same horizontal plane at the open position and the closed position (as shown in FIG. 2 and FIG. 3).

The end portion 23 at a lower edge of the movable leaf 20 corresponds to a lower edge of the door, and the lower edge of the fixed leaf 10 remains fixed in an opening or closing process of the hinge assembly 100, and the lower edge of the fixed leaf 10 may be fixed relative to the skirting board as a reference point, and may be equivalent to an upper edge of the skirting board. Further, the first pin shaft 11 slidingly cooperates with the first slide groove 21, and the second pin shaft 12 slidingly cooperates with the second slide groove 22. Furthermore, a mutual limitation between the first pin shaft 11 and the first slide 21, and a mutual limitation between the second pin shaft 12 and the second slide 22 can confine a movement trajectory of the movable leaf 20, allowing the end portion 23 of the movable leaf 20 to be located in the same horizontal plane at the open position and the closed position, and correspondingly allowing the lower edge of the door to be located in the same horizontal plane. Further, the end portion 23 always first moves away from the lower edge of the fixed leaf 10 (corresponding to the lower edge of the door moving away from the skirting board) in the opening or closing process of the door.

It should be understood that the upper edge of the skirting board is located in the same horizontal plane, and correspondingly the lower edge of the door can be located in another horizontal plane above the upper edge of the skirting board at the closed position. The end portion 23 in the same horizontal plane at the open position and the closed position can ensure that the lower edge of the door will not interfere with the skirting board at the open position and the closed position, which can improve the convenience of opening and closing the door. Further, in the opening or closing process of the door, the lower edge of the door always first moves away from the upper edge of the skirting board to avoid interference between the door and the skirting board in the opening or closing process of the door. In this way, it is not necessary to cut the skirting board, and thus the indoor aesthetic appeal can be improved.

In an actual opening process of the door, a movement of the end portion 23 may include an upward movement and then a downward movement to avoid interference in the opening or closing process of the door. Further, the end portion 23 is located above the skirting board at the closed position and the open position. In some other embodiments, the movement of the end portion 23 may include an outward translation to move away from the skirting board, and then an upward movement to be located above the skirting board after moving to the open position. The phrase "be located above the skirting board" means that the end portion 23 may be directly above or laterally above (i.e., at a higher position but not directly over) to avoid interference.

In the opening or closing process of the door, the movement of the door relative to the skirting board, i.e., the movement of the end portion 23 away from the lower edge of the fixed leaf 10 to avoid interference with the skirting board has various forms, which are not limited in the present disclosure. Embodiments in which the above movement can be realized to avoid the interference between the door and the skirting board should fall within the scope of the present disclosure.

In addition, when the end portion 23 moves away from the lower edge of the fixed leaf 10, the interference between the skirting board and the door can be avoided. In a whole movement process, the end portion 23 moves away from the fixed leaf 10 first, and after the interference is effectively avoided, the end portion 23 is located in the same horizontal plane at the open position and the closed position. While avoiding the interference between the door and the skirting board at the open position and the closed position, the movement trajectory of the door can be made more reasonable, avoiding excessive movement trajectory that would increase the space occupied by the kitchen device at the open position. Therefore, the layout convenience of the kitchen device can be improved, and the space requirement of the kitchen device can be reduced.

In the hinge assembly 100 according to the embodiments of the present disclosure, a distance fluctuation between the lower edge of the door and the skirting board is made zero through the cooperation between the first pin shaft 11 and the first slide groove 21 and the cooperation between the second pin shaft 12 and the second slide groove 22. At the closed position, a thickness side surface in a thickness direction of the door defines the lower edge. At the open position, the lower edge is defined by a shielding side surface of the door for shielding the treatment space. In a switching process between the open position and the closed position, the lower edge of the door switches between the thickness side surface and the shielding side surface. In an example, in the opening process of the door, the low edge is gradually changed from the thickness side surface to the shielding side surface, and in the closing process of the door, the lower edge is gradually changed from the shielding side surface to the thickness side surface). The lower edge is a dynamic edge. In the hinge assembly 100 in the related art, when an edge line of the door (a line where the thickness side surface intersects the shielding side surface) corresponding to the end portion 23 is formed as the lower edge, the door is closest to the skirting board and is prone to generating interference. In the present disclosure, a relative movement of the end portion 23 to the lower edge of the fixed leaf 10 is limited to ensure that the edge line of the door moves away from the skirting board.

In the hinge assembly 100 according to the embodiments of the present disclosure, by providing the first pin shaft 11 to cooperate with the first slide groove 21 and the second pin shaft 12 to cooperate with the second slide groove 22, through double movement trajectory restricted cooperation, the end portion 23 can first move away from the lower edge of the fixed leaf 10 in the opening or closing process of the movable leaf 10, and the end portion 23 is located in the same horizontal plane at the open position and the closed position. On the one hand, interference between the door disposed at the movable leaf 20 and the skirting board can be avoided, thus it is not necessary to cut the skirting board. Therefore, the indoor aesthetic appeal can be improved. On the other hand, the movement trajectory of the door is more reasonable, allowing a space occupied by the door at the open position to be smaller, which can reduce a space requirement of the kitchen device and improve the layout convenience.

In addition, a double pin shaft and slide groove cooperation structure has a higher movement smoothness, which can reduce shaking in the opening or closing process of the door, and improve the convenience of opening and closing the door. Moreover, opening and closing noises generated in the opening or closing process of the door can be reduced, improving user experience.

Figure 4:
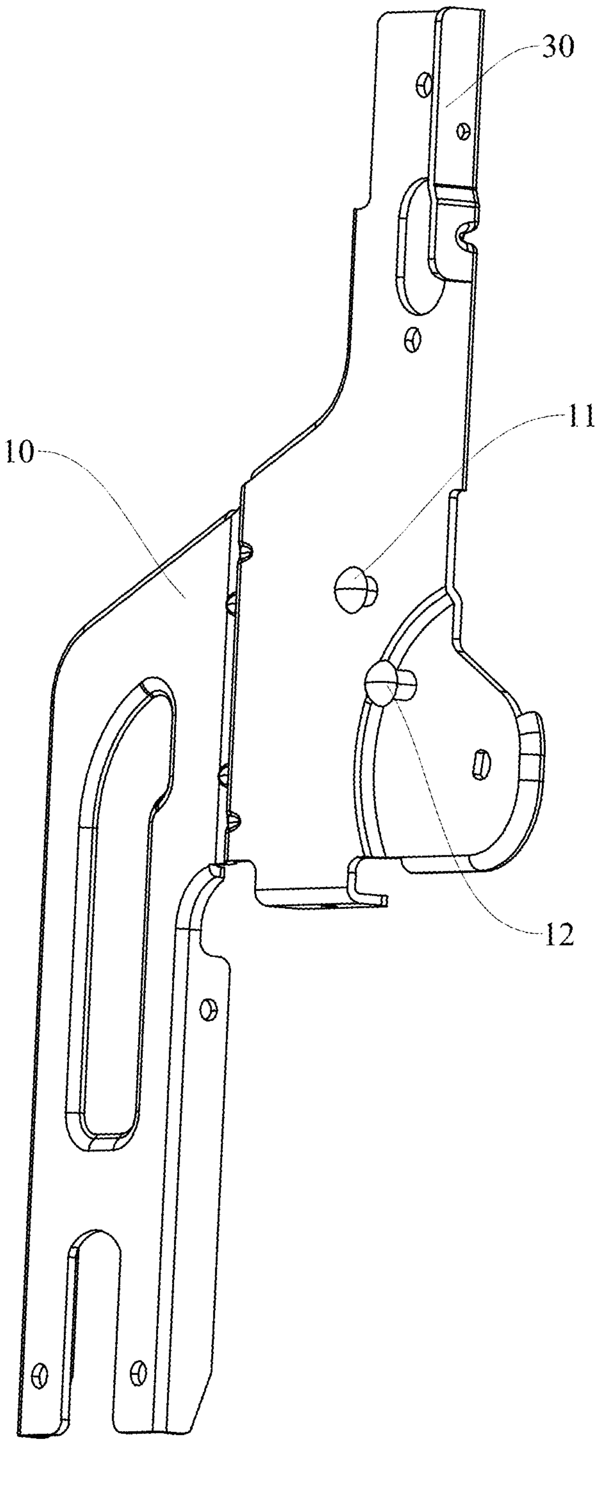
FIG. 4 is a schematic view of a fixed leaf of a hinge assembly according to an embodiment of the present disclosure.

As shown in FIG. 2 and FIG. 4, according to some embodiments of the present disclosure, the second pin shaft 12 is disposed in front of the first pin shaft 11, and the first pin shaft 11 is disposed at a higher position than the second pin shaft 12.

Since the second pin shaft 12 is located in front of the first pin shaft 11 and there is a height difference between the first pin shaft 11 and the second pin shaft 12, in the opening process of the door, the first pin shaft 11 pulls the movable leaf in the first slide groove 21 to move upwardly as a whole, and rotates around the second pin shaft 12 in the second slide groove 22, so as to drive the end portion 23 to first move away from the lower edge of the fixed leaf 10. In this way, the interference can be avoided.

Next, referring to FIG. 5, the opening process of the movable leaf 20 according to the embodiments of the present disclosure will be described in detail.

The first slide groove 21 has a first groove section 21*a*, a third groove section 21*b*, and a fifth groove section 21*c* that are in communication with each other sequentially. The second slide groove 22 has a second groove section 22*a* and a fourth groove section 22*b* that are in communication with each other sequentially. The first groove section 21*a* and the second groove section 22*a* are travel start points in the first slide groove 21 and the second slide groove 22, respectively. The fifth groove section 21*c* and the fourth groove section 22*b* are travel end points in the second slide groove 22 and the first slide groove 21, respectively.

An opening process of the movable leaf may have three stages including a first stage in which the first groove section 21*a* cooperates with the first pin shaft 11 and the second groove section 22*a* cooperates with the second pin shaft 12, a second stage in which the third groove section 21*b* cooperates with the first pin shaft 11 and the fourth groove section 22*b* cooperates with the second pin shaft 12, and a third stage in which the fifth groove section 21*c* cooperates with the first pin shaft 11 and the fourth groove section 22*b* cooperates with the second pin shaft 12.

Figure 5:
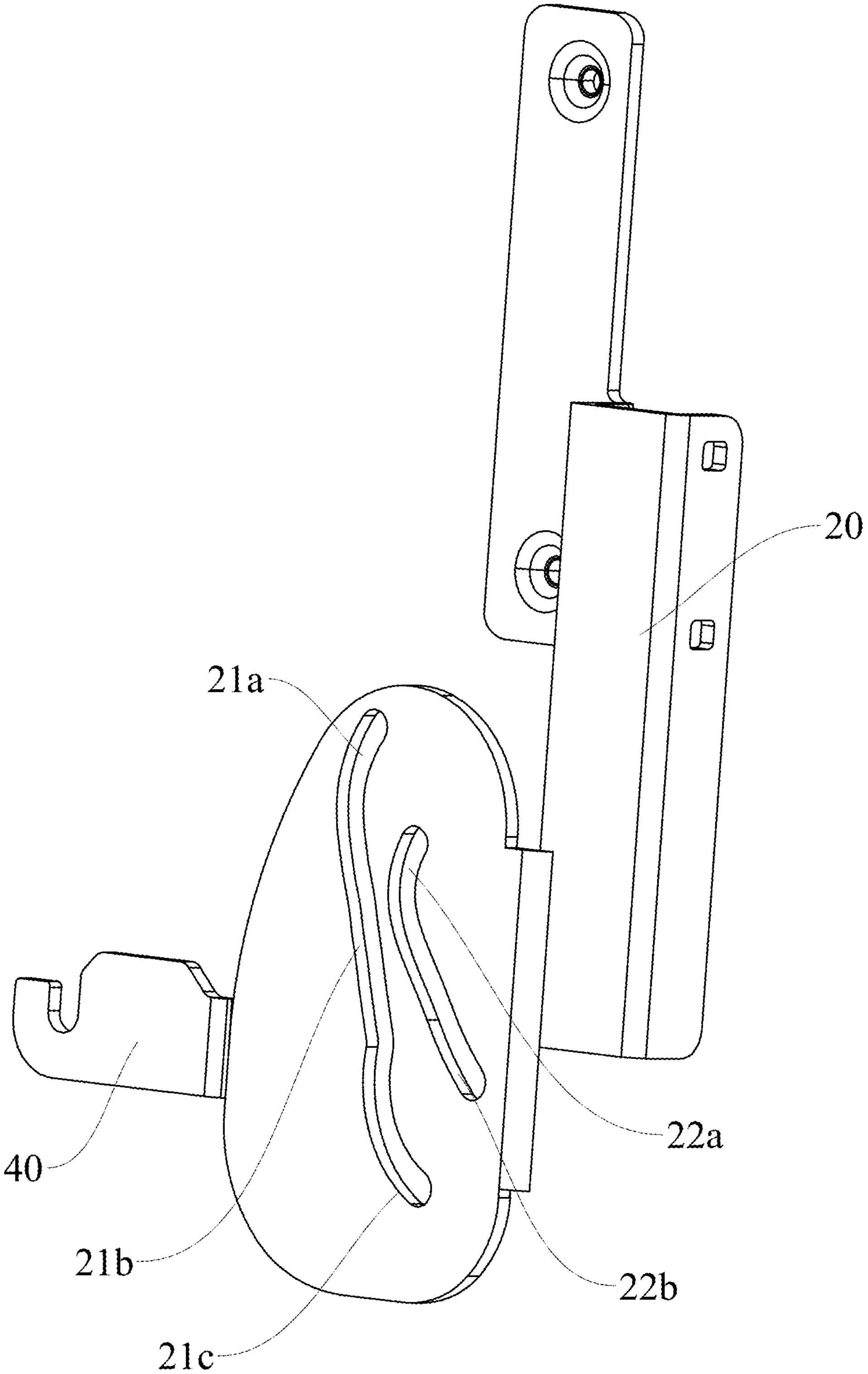
FIG. 5 is a schematic view of a movable leaf of a hinge assembly according to an embodiment of the present disclosure.

As shown in FIG. 5, the first slide groove 21 includes the first groove section 21*a*, and the second slide groove 22 includes a second groove section 22*a*. The travel start point in the first slide groove 21 is located at an end of the first groove section 21*a*, and the travel start point in the second slide groove 22 is located at an end of the second groove section 22*a*. further, the first groove section 21*a* and the second groove section 22*a* are configured to rotate the end portion 23 and move the end portion 23 upwardly in the opening process of the movable leaf 20.

In the first stage, the first groove section 21*a* cooperates with the first pin shaft 11, and the second groove section 22*a* cooperates with the second pin shaft 12, pulling the end portion 23 to rotate while moving upwardly relative to the lower edge of the fixed leaf 10. In this way, an initial opening of the door is realized, and the interference between the door and the skirting board is avoided in the initial opening process of the door.

As shown in FIG. 5, the first groove section 21*a* and the second groove section 22*a* are each constructed as a rearwardly bent arc-shaped groove at the closed position. The second groove section 22*a* has an arc length smaller than an arc length of the first groove section 21*a*, and the first groove section 21*a* has an equivalent circular radius greater than an equivalent circular radius of the second groove section 22*a*.

Therefore, in the opening process of the door, the first pin shaft 11 acts on the first groove section 21*a*, and the second pin shaft 12 acts on the second groove section 22*a*. Further, a moment for pulling the movable leaf 20 upwardly is generated, which drives the end portion 23 to move upwardly, i.e., the end portion 23 is driven to first move away from the lower edge of the fixed leaf 10, as described above.

As shown in FIG. 5, the first groove section 21*a* is in communication with the third groove section 21*b*, and the second groove section 22*a* is in communication with the fourth groove section 22*b*. Further, the third groove section 21*b* and the fourth groove section 22*b* are configured to move the end portion 23 downwardly in the opening process of the movable leaf 20.

In the second stage, the third groove section 21*b* cooperates with the first pin shaft 11, and the fourth groove section 22*b* cooperates with the second pin shaft 12. Further, the end portion 23 is pulled to move towards the lower edge of the fixed leaf 10. That is, the movement restriction to enables the end portion 23 to be located in the same horizontal plane at the closed position and the open position is realized.

It should be understood that, when the end portion 23 first moves away from the lower edge of the fixed leaf 10 first and then moves towards the lower edge of the fixed leaf 10, the interference between the door and the skirting board can be avoided, and a movement travel away from the lower edge of the fixed leaf 10 in the opening process of the door is more reasonable. Therefore, the space occupied by the door at the open position can be reduced.

As shown in FIG. 5, at the closed position, both the third groove section 21*b* and the fourth groove section 22*b* are inclined forwardly and extend downwardly, and a length of the third groove section 21*b* is greater than a length of the fourth groove section 22*b*.

Thus, the first pin shaft 11 can be pulled by the third groove section 21*b* of a greater length to generate a moment for pulling the movable leaf 20 downwardly, so as to drive the end portion 23 to move downwardly.

Each of the third groove section 21*b* and the fourth groove section 22*b* may be constructed as a straight groove section or an arc-shaped groove section.

As shown in FIG. 2 and FIG. 5, the first slide groove 21 further includes the fifth groove section 21*c* in communication with the third groove section 21*b*. The travel end point in the first slide groove 21 is located at the fifth groove section 21*c*, and the travel end point in the second slide groove 22 is located at the fourth slide groove. The fifth groove section 21*c* is configured to drive the end portion 23 to rotate in the opening process of the movable leaf 20.

In the third stage, the fifth groove section 21*c* cooperates with the first pin shaft 11, and the fourth groove section 22*b* cooperates with the second pin shaft 12. Further, the door finally moves into the open position in the third stage. In addition, before finally reaching the open position, the second pin shaft 12 first moves to the travel end point in the second slide groove 22. Meanwhile, the first pin shaft 11 cooperates with the fifth groove section 21*c*, allowing the door to rotate into the open position around an axis of the second pin shaft 12. That is, in the first stage and the second stage, a relative position of the end portion 23 to the lower edge of the fixed leaf 10 can be adjusted to avoid the interference between the skirting board and the door. In addition, in the second stage, further rotation is implemented to fully open the door.

Thus, the fifth groove section 21*c* is constructed as an arc-shaped groove.

As shown in FIG. 1, FIG. 2, and FIG. 4, one of the movable leaf 20 and the fixed leaf 10 is provided with a limit plate 30, and another one of the movable leaf 20 and the fixed leaf 10 is provided with a limit arm 40 cooperating with the limit plate 30.

The limit plate 30 may be disposed at the movable leaf 20 and the limit arm 40 may be disposed at the fixed leaf 10, or the limit plate 30 may be disposed at the fixed leaf 10 and the limit arm 40 may be disposed at the movable leaf 20. A pushing cooperation between the limit plate 30 and the limit arm 40 can limits an opening angle of the movable leaf 20, and can implement hovering of the door at the open position after the door moves to the open position to prevent the door from being excessively opened. Correspondingly, a buffer structure may be disposed at the limit arm 40 or the limit plate 30, to provide a buffer for the door to avoid large opening noise caused by excessive opening force from a user. Further, the opening stability of the door can be improved. In a case where some door may be provided with a transparent structure such as glass and acrylic plate to form a visible kitchen device, such an arrangement can further prevent the transparent structure from being shattered and prolong a service life of the door.

A kitchen device according to embodiments of the present disclosure includes a housing, a door, and the hinge assembly 100 as described in the above embodiments. The fixed leaf 10 is disposed at the housing, and the movable leaf 20 is disposed at the door. The kitchen device has the same technical effect as the hinge assembly 100, and thus detailed description thereof will be omitted herein.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the invention shall be defined by the claims as appended and their equivalents.

What is claimed is:

1. A hinge assembly comprising:

a fixed leaf including a first pin shaft and a second pin shaft, the first pin shaft and the second pin shaft extending in a horizontal direction; and a movable leaf having a first slide groove cooperating with the first pin shaft and a second slide groove cooperating with the second pin shaft in such a manner that the movable leaf is capable of switching between an open position and a closed position;

wherein:

an end portion at a lower edge of the movable leaf moves away from a lower edge of the fixed leaf at a beginning of an opening or closing process of the movable leaf, and the end portion is located in a same horizontal plane at the open position and the closed position, the horizontal plane being parallel to the horizontal direction and perpendicular to a vertical direction;

when the movable leaf at the closed position, the first pin shaft is at a first end of the first slide groove, and the second pin shaft is at a first end of the second slide groove;

when the movable leaf is at the open position, the first pin shaft is at a second end of the first slide groove, and the second pin shaft is at a second end of the second slide groove; and the movable leaf has a first edge and a second edge opposite to the first edge along a direction, the first end of the first slide groove and the first end of the second slide groove are closer to the first edge than the second edge, and the second end of the first slide groove and the second end of the second slide groove are closer to the second edge than the first edge.

2. The hinge assembly according to claim 1, wherein:

the second pin shaft is disposed in front of the first pin shaft; and the first pin shaft is disposed at a higher position than the second pin shaft.

3. The hinge assembly according to claim 2, wherein:

the first slide groove includes a first groove section, and the second slide groove includes a second groove section;

a travel start point in the first slide groove is located at an end of the first groove section, and a travel start point in the second slide groove is located at an end of the second groove section; and the first groove section and the second groove section are configured to rotate the end portion and move the end portion upwardly in the opening process of the movable leaf.

4. The hinge assembly according to claim 3, wherein the first groove section and the second groove section are each constructed as an arc-shaped groove that is bent rearwardly at the closed position, an arc length of the second groove section being shorter than an arc length of the first groove section.

5. The hinge assembly according to claim 3, wherein a radius of the first groove section is greater than a radius of the second groove section.

6. The hinge assembly according to claim 3, wherein:

the first slide groove further includes a third groove section in communication with the first groove section;

the second slide groove further includes a fourth groove section in communication with the second groove section; and the third groove section and the fourth groove section are configured to move the end portion downwardly in the opening process of the movable leaf.

7. The hinge assembly according to claim 6, wherein at the closed position, each of the third groove section and the fourth groove section is inclined forwardly and extends downwardly.

8. The hinge assembly according to claim 6, wherein a length of the third groove section is greater than a length of the fourth groove section.

9. The hinge assembly according to claim 6, wherein:

the first slide groove further includes a fifth groove section in communication with the third groove section;

a travel end point in the first slide groove is located at the fifth groove section, and a travel end point in the second slide groove is located at the fourth groove section; and the fifth groove section is configured to drive the end portion to rotate in the opening process of the movable leaf.

10. The hinge assembly according to claim 9, wherein the fifth groove section is constructed as an arc-shaped groove.

11. The hinge assembly according to claim 1, wherein one of the movable leaf and the fixed leaf is provided with a limit plate, and another one of the movable leaf and the fixed leaf is provided with a limit arm cooperating with the limit plate.

12. A kitchen device comprising:

a housing;

a door; and the hinge assembly according to claim 1.

13. The kitchen device according to claim 12, wherein:

the second pin shaft is disposed in front of the first pin shaft; and the first pin shaft is disposed at a higher position than the second pin shaft.

14. The kitchen device according to claim 13, wherein:

the first slide groove includes a first groove section, and the second slide groove includes a second groove section;

a travel start point in the first slide groove is located at an end of the first groove section, and a travel start point in the second slide groove is located at an end of the second groove section; and the first groove section and the second groove section are configured to rotate the end portion and move the end portion upwardly in the opening process of the movable leaf.

15. The kitchen device according to claim 14, wherein the first groove section and the second groove section are each constructed as an arc-shaped groove that is bent rearwardly at the closed position, an arc length of the second groove section being shorter than an arc length of the first groove section.

16. The kitchen device according to claim 14, wherein:

the first slide groove further includes a third groove section in communication with the first groove section;

the second slide groove further includes a fourth groove section in communication with the second groove section; and the third groove section and the fourth groove section are configured to move the end portion downwardly in the opening process of the movable leaf.

17. The kitchen device according to claim 14, wherein:

the first slide groove further includes a fifth groove section in communication with the third groove section;

a travel end point in the first slide groove is located at the fifth groove section, and a travel end point in the second slide groove is located at the fourth groove section; and the fifth groove section is configured to drive the end portion to rotate in the opening process of the movable leaf.

18. A hinge assembly comprising:

a fixed leaf including a first pin shaft and a second pin shaft, the first pin shaft and the second pin shaft being parallel to a horizontal direction; and a movable leaf having a first slide groove cooperating with the first pin shaft and a second slide groove cooperating with the second pin shaft in such a manner that the movable leaf is capable of switching between an open position and a closed position;

wherein:

an end portion at a lower edge of the movable leaf moves away from a lower edge of the fixed leaf at a beginning of an opening or closing process of the movable leaf, and the end portion is located in a same horizontal plane at the open position and the closed position, the horizontal plane being parallel to the horizontal direction and perpendicular to a vertical direction; and each of the first slide groove and the second slide groove has an arc-shaped groove section with a curved centerline bulging out towards an edge of the movable leaf.

19. The hinge assembly according to claim 1, wherein:

the first slide groove includes a first groove section, a second groove section, and a third groove section connected in sequence, the first groove section bends relative to the second groove section toward a first direction, the third groove section bends relative to the second groove section toward a second direction, and the first direction is opposite to the second direction.

* * * * *